United States Patent
Kang

(10) Patent No.: US 11,882,621 B2
(45) Date of Patent: Jan. 23, 2024

(54) METHOD AND SYSTEM FOR TRANSMITTING AND RECEIVING DATA USING BLUETOOTH LOW ENERGY

(71) Applicant: METASOLUCOM CO., LTD, Incheon (KR)

(72) Inventor: Joo Hyung Kang, Gwangju (KR)

(73) Assignee: METASOLUCOM CO., LTD, Incheon (KR)

( * ) Notice: Subject to any disclaimer, the term of this patent is extended or adjusted under 35 U.S.C. 154(b) by 0 days.

(21) Appl. No.: 17/697,803

(22) Filed: Mar. 17, 2022

(65) Prior Publication Data
US 2023/0300594 A1 Sep. 21, 2023

(30) Foreign Application Priority Data
Mar. 15, 2022 (KR) .................. 10-2022-0031789

(51) Int. Cl.
*H04W 4/80* (2018.01)
*H04W 8/00* (2009.01)
*H04W 8/30* (2009.01)

(52) U.S. Cl.
CPC ............ *H04W 8/005* (2013.01); *H04W 4/80* (2018.02); *H04W 8/30* (2013.01)

(58) Field of Classification Search
CPC .......... H04W 8/005; H04W 4/80; H04W 8/30
USPC ....................................... 455/41.2
See application file for complete search history.

(56) References Cited

U.S. PATENT DOCUMENTS

| | | | |
|---|---|---|---|
| 2017/0245104 A1* | 8/2017 | Klimek | G01S 5/0226 |
| 2017/0272166 A1* | 9/2017 | Albrecht | H04B 10/516 |
| 2018/0180704 A1* | 6/2018 | Khan | G01S 5/02525 |
| 2018/0192253 A1* | 7/2018 | Khan | H04W 4/80 |
| 2019/0236600 A1* | 8/2019 | Glendenning | H04B 17/318 |
| 2020/0014768 A1* | 1/2020 | Kim | G06F 16/955 |
| 2020/0153527 A1* | 5/2020 | Matsunaga | H04J 3/0664 |
| 2022/0164857 A1* | 5/2022 | Kashiwakura | G06Q 30/0605 |

FOREIGN PATENT DOCUMENTS

KR 10-2018-0078058 A 7/2018

* cited by examiner

*Primary Examiner* — April G Gonzales
(74) *Attorney, Agent, or Firm* — BROADVIEW IP LAW, PC

(57) ABSTRACT

Provided is a data transmission/reception method performed in a data transmission/reception system including a sensing terminal and a user terminal connected through Bluetooth low energy (BLE) communication. The data transmission/reception method includes operations of allowing the sensing terminal to acquire sensing data, allowing the sensing terminal to sequentially assign a number on the basis of the time at which the sensing data is acquired and store the number in a packet of the sensing data, and allowing the sensing terminal to transmit the sensing data in which the number is stored to the user terminal in a broadcast mode of the BLE communication.

9 Claims, 6 Drawing Sheets

METHOD AND SYSTEM FOR TRANSMITTING AND RECEIVING DATA USING BLUETOOTH LOW ENERGY

CROSS-REFERENCE TO RELATED APPLICATION

This application claims priority to and the benefit of Korean Patent Application No. 2022-0031789, filed on Mar. 15, 2022, the disclosure of which is incorporated herein by reference in its entirety.

BACKGROUND

1. Field of the Invention

The present invention relates to data transmission/reception technology, and more particularly, to a data transmission/reception method and system for implementing a data loss recovery protocol using Bluetooth low energy (BLE) communication.

2. Discussion of Related Art

Recently, health care terminals that sense and store users' biometric information have been widely used. Because a health care terminal can acquire biometric information but cannot directly interpret acquired data, the data is inevitably sent to another device that analyzes the data and composes statistical data. In this case, a commonly used device for data storage and data analysis is a smartphone, and a smartphone and a health care terminal transmit and receive data through Bluetooth communication, which enables communication at the lowest cost. In order to use Bluetooth communication, a smartphone and a health care terminal should be paired. After pairing, it is necessary for a user to confirm data on the smartphone every time the data is transmitted from the health care terminal. It may be burdensome for the user to confirm the data and perform a touch operation on the smartphone every time. Especially, it may be more burdensome for the elderly who are not familiar with smartphones. Due to the inconvenience of the pairing scheme, a system that delivers information between a health care terminal and a smartphone in real time may be used. However, in this case, there is a possibility that biometric information may be lost, and the health care terminal cannot check whether biometric information having been transmitted to the smartphone is received normally.

SUMMARY OF THE INVENTION

It is an object of the present invention to provide a data transmission/reception method and system for transmitting data using Bluetooth low energy (BLE) communication without pairing.

It is another object of the present invention to provide a data transmission/reception method and system for recovering lost data using a switch between a broadcast mode and a connection mode of BLE communication.

The technical objects of the present invention are not limited to those described above, and other technical objects that are not described herein will be apparently understood by those skilled in the art from the following description.

According to a first aspect of the present invention to achieve the objects, there is provided a data transmission/reception method performed in a data transmission/reception system including a sensing terminal and a user terminal connected through Bluetooth low energy (BLE) communication, the data transmission/reception method including operations of allowing the sensing terminal to acquire sensing data, allowing the sensing terminal to sequentially assign a number on the basis of the time at which the sensing data is acquired and store the number in a packet of the sensing data, and allowing the sensing terminal to transmit the sensing data in which the number is stored to the user terminal in a broadcast mode of the BLE communication.

The data transmission/reception method may further include operations of allowing the user terminal to receive the sensing data, allowing the user terminal to compare the number of the sensing data to the number of prestored sending data, and allowing the user terminal to store the received sensing data and determine whether to request recovery of sensing data having a specific number according to a comparison result of the numbers.

The operation of allowing the user terminal to store the received sensing data and determine whether to request recovery of sensing data having a specific number according to a comparison result of the numbers may include operations of checking whether sensing data having the same format as the received sensing data is prestored and determining not to proceed with the recovery request when sensing data having the same format as the received sensing data is not prestored.

The operation of allowing the user terminal to store the received sensing data and determine whether to request recovery of sensing data having a specific number according to a comparison result of the numbers may include operations of checking whether the sensing data having the same format as the received sensing data is prestored, comparing the number of the received sensing data and the number of the last stored sensing data among the prestored sensing data having the same format when the sensing data having the same format is prestored, determining a number between the number of the received sensing data and the number of the last stored sensing data as a missing number when the number of the last stored sensing data and the number of the received sensing data are not continuous, and determining to proceed with a request for recovery of sensing data corresponding to the missing number.

The operation of allowing the user terminal to store the received sensing data and determine whether to request recovery of sensing data having a specific number according to a comparison result of the numbers may include operations of checking whether the sensing data having the same format as the received sensing data is prestored, checking the number of the received sensing data and the numbers of all the prestored sensing data having the same format when the sensing data having the same format is prestored, determining whether the checked numbers are continuous to check a missing number, and determining to proceed with a request for recovery of sensing data corresponding to the missing number.

The data transmission/reception method may further include operations of allowing the user terminal to request a connection mode of the BLE communication from the sensing terminal to proceed with the recovery request and allowing the user terminal to pair with the sensing terminal to switch to a connection mode.

The data transmission/reception method may further include operations of allowing the user terminal to request the sensing data corresponding to the missing number from the sensing terminal, allowing the user terminal to transmit a reception completion response to the sensing terminal when the sensing data corresponding to the missing number is received from the sensing terminal, and allowing the user terminal to store the sensing data corresponding to the missing number.

The data transmission/reception method may further include operations of allowing the sensing terminal to request current time information from the user terminal when a request for the sensing data corresponding to the missing number is received from the user terminal, allowing the sensing terminal to check acquisition time information for the sensing data corresponding to the missing number and the current time information received from the user terminal and determine sensing data to be transmitted to the user terminal, and allowing the sensing terminal to transmit the determined sensing data to the user terminal.

The data transmission/reception method may further include operations of allowing the user terminal to request the broadcast mode of the BLE communication from the sensing terminal when the recovery of the sensing data corresponding to the missing number is completed and allowing the user terminal and the sensing terminal to switch to the broadcast mode.

According to a second aspect of the present invention to achieve the above objects, there is provided a data transmission/reception system including a sensing terminal configured to acquire sensing data and a user terminal connected to the sensing terminal through Bluetooth low energy (BLE) communication and configured to receive the sensing data, wherein a number is sequentially assigned to the sensing data on the basis of the time at which the sensing data is acquired, and is stored in a packet of the sensing data, and the sensing data is transmitted in a broadcast mode of the BLE communication.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
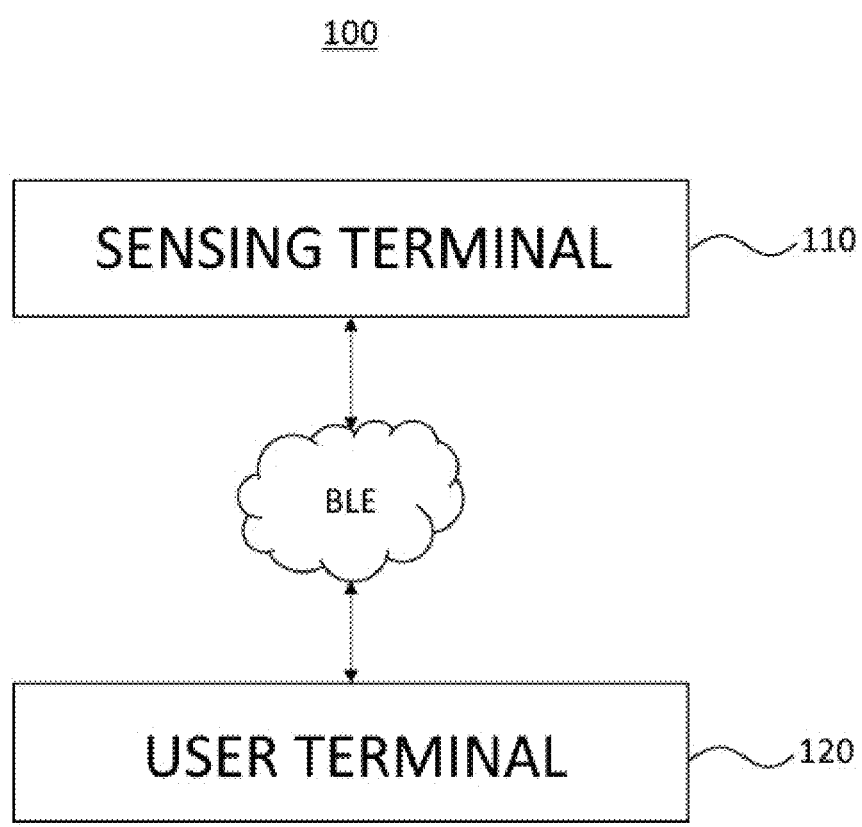
FIG. 1 is a diagram illustrating a data transmission/reception system according to an exemplary embodiment of the present invention.

Advantages and features of the present invention and implementation methods thereof will be clarified through the following embodiments described in detail with reference to the accompanying drawings. However, the present invention is not limited to embodiments disclosed herein and may be implemented in various different forms. The embodiments are provided for making the disclosure of the prevention invention thorough and for fully conveying the scope of the present invention to those skilled in the art. It is to be noted that the scope of the present invention is defined by the claims. Like reference numerals refer to like elements throughout. The term "and/or" includes each and every combination of one or more of the recited items.

It will be appreciated that, although the terms first, second, etc. may be used herein to describe various devices, elements, and/or sections, these devices, elements, and/or sections should not be limited by these terms. These terms are only used to distinguish one device, element, or section from another. Thus, it will be appreciated that a first device, a first element, or a first section could be termed a second device, a second element, or a second section without departing from the technical spirit of the present invention.

Also, identification symbols (e.g., a, b, c, etc.) in steps are used for convenience of description and do not describe the order of the steps, and the steps may be performed in a different order from a specified order unless the order is clearly specified in context. That is, the respective steps may be performed in the same order as described, substantially simultaneously, or in reverse order.

The terminology used herein is for the purpose of describing particular embodiments only and is not intended to be limiting of the invention. Herein, the singular shall be construed to include the plural, unless the context clearly indicates otherwise. The terms "comprises" and/or "comprising" used herein specify the presence of stated elements, steps, operations, and/or components, but do not preclude the presence or addition of one or more other elements, steps, operations, and/or components.

Unless otherwise defined, all terms (including technical and scientific terms) used herein have the same meanings as commonly understood by one of ordinary skill in the art to which this invention belongs. Also, terms defined in commonly used dictionaries should not be interpreted in an idealized or overly formal sense unless expressly so defined herein.

In addition, in describing the invention, when it is determined that the detailed description of a known function or configuration may unnecessarily obscure the gist of the invention, the detailed description thereof will be omitted. Also, the following terms are defined considering functions of the embodiments of the present invention and may be differently defined depending on a user, the intent of an operator, or a custom. Therefore, the definition should be made based on the content throughout this specification.

FIG. 1 is a diagram illustrating a data transmission/reception system according to an exemplary embodiment of the present invention.

Referring to FIG. 1, a data transmission/reception system 100 includes a sensing terminal 110 and a user terminal 120, and the sensing terminal 110 and the user terminal 120 are connected to each other through Bluetooth low energy (BLE) communication.

First, a communication scheme used in the present invention will be described. The BLE communication, which is a Bluetooth low-power protocol, operates with lower power than Bluetooth, thereby reducing battery consumption of devices. Thus, the BLE communication may be applied to devices such as smart bands, smart watches, or beacons. The BLE communication may be classified into a broadcast mode and a connection mode according to the operating scheme. The broadcast mode, which is also called advertisement mode, has a characteristic feature of transmitting data to one or more devices at a time by unilaterally sending a signal to all nearby devices without designating a specific device. On the other hand, the connection mode requires a 1:1 pairing process between devices. In the connection mode, when devices are connected, data may be transmitted and received between the connected devices according to the Channel Hopping rule. The present invention relates to a data transmission/reception method performed between the sensing terminal 110 and the user terminal 120 connected through the BLE communication.

The sensing terminal 110 is a device that acquires sensing data through a sensor provided therein and may correspond to, for example, a wearable healthcare device that is worn by a user to sense his or her biometric information. There are no restrictions on the type of the sensing terminal 110 as long as the sensing terminal 110 has a sensor and thus can acquire sensing data from the sensor, store the acquired sensing data, and transmit the sensing data to another external device. Also, although one sensing terminal 110 is shown in FIG. 1, there is no limit to the number of sensing terminals 110 connected to the user terminal 120.

Figure 2:
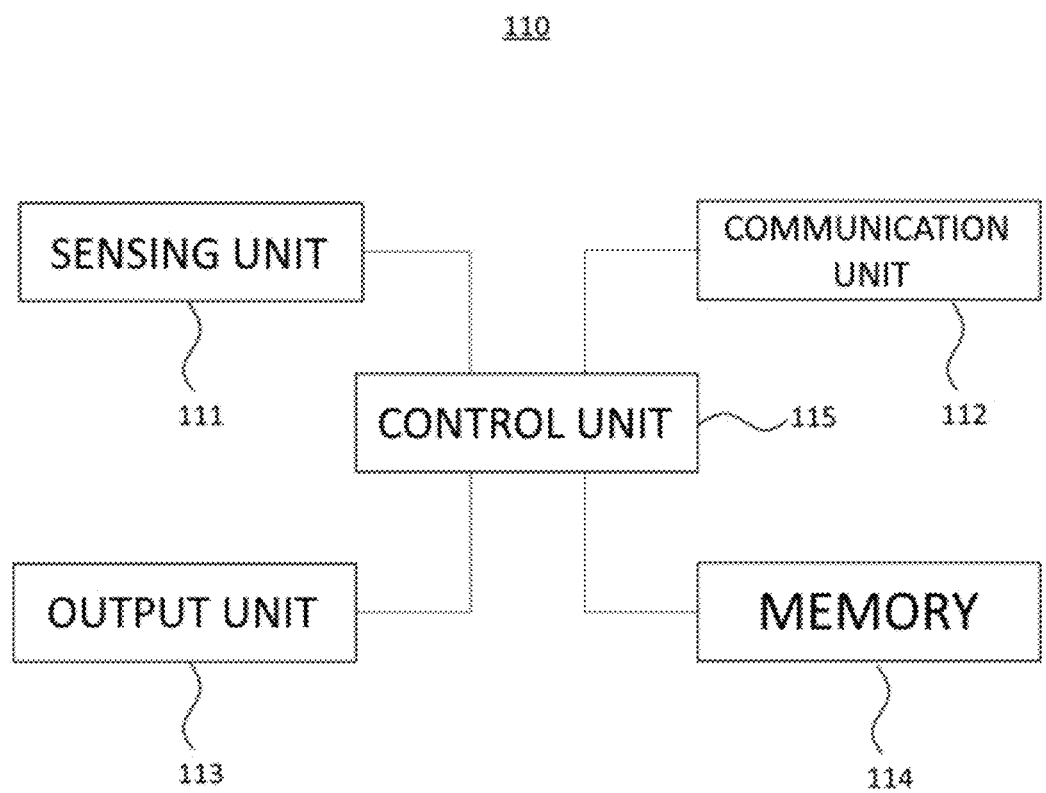
FIG. 2 is a diagram showing a sensing terminal according to an embodiment.

Preferably, referring to FIG. 2, the sensing terminal 110 includes a sensing unit 111, a communication unit 112, an output unit 113, a memory 114, and a control unit 115.

The sensing unit 111 includes a sensor such as an illuminance sensor, a temperature sensor, or an acceleration sensor (the sensor types are not limited thereto) and acquires sensing data from the sensor. For example, the sensing data may correspond to an ambient temperature, a heart rate, a number of steps, or the like.

The communication unit 112 may provide an interconnection-enabled environment in order to transmit or receive data to or from the user terminal 120 and may correspond to the above-described BLE communication protocol.

The output unit 113 outputs a screen for controlling the operation control of the sensing terminal 110, the confirmation of the sensing data, and the operation control of the user terminal 120 for interaction between the sensing terminal 110 and the user and may include, for example, a liquid crystal display (LCD) display.

The memory 114 may store sensing data acquired by the sensing unit 111 and may correspond to, for example, a flash memory.

The control unit 115 may control the overall operation of each component of the sensing terminal 110 and perform a computational operation on at least one application or program for executing the methods according to the embodiments of the present invention.

The user terminal 120 is a device that stores, processes, or analyzes the sensing data received from the sensing terminal 110. Preferably, the user terminal 120 refers to any kind of hardware device including at least one processor and may be understood as encompassing software configurations operating in the corresponding hardware devices depending on the embodiment. For example, the user terminal 120 may correspond to a smartphone or a tablet PC and may be understood to include both a user client and an application running in each device. However, the present invention is not limited thereto.

Figure 3:
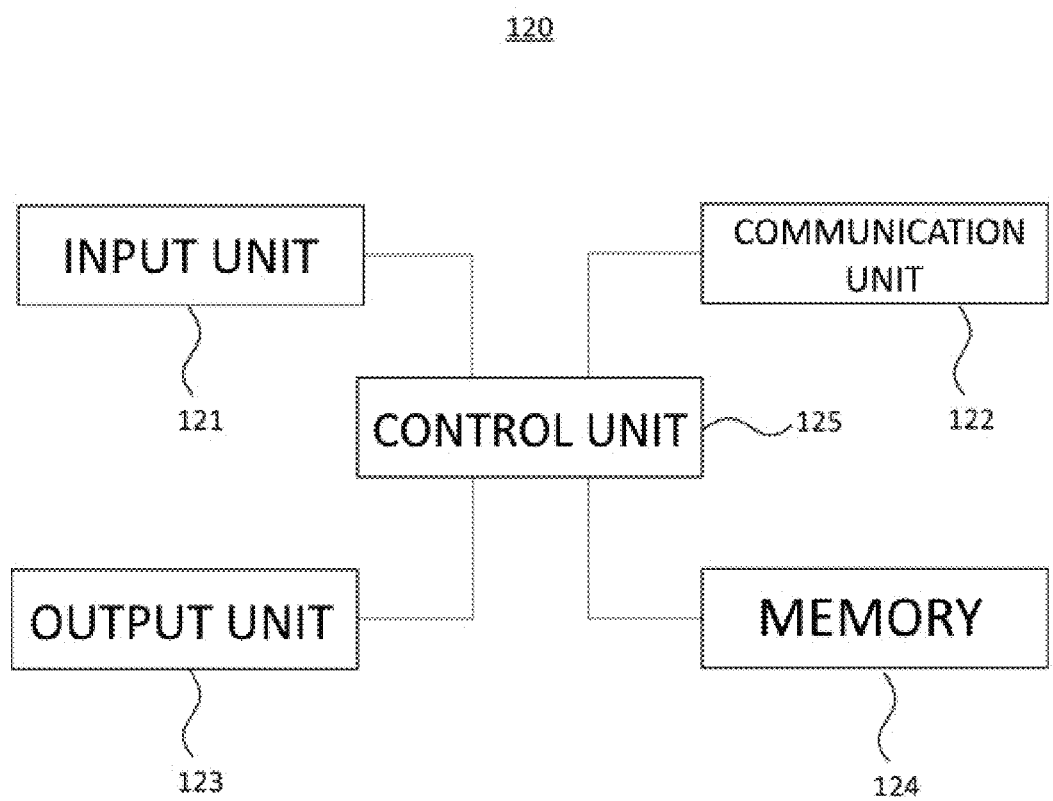
FIG. 3 is a diagram showing a user terminal according to an embodiment.

Preferably, referring to FIG. 3, the user terminal 120 includes an input unit 121, a communication unit 122, an output unit 123, a memory 124, and a control unit 125. Here, the elements of the user terminal 120 may transmit and receive signals to and from internal elements through a connection path (e.g., a bus, etc.)

The input unit 121 receives data from a user through a user interface. For example, the input unit 121 may include a touch screen.

The communication unit 122 may provide an interconnection-enabled environment in order to transmit or receive data to or from the sensing terminal 110 and may correspond to the above-described BLE communication protocol.

The output unit 123 may output an operation performed by the user terminal 120 to interact with a user and may correspond to, for example, a display.

The memory 124 stores various kinds of data, instructions, or information. Preferably, programs (one or more instructions) for processing and control of the control unit 125 may be stored in the memory 124, and the programs stored in the memory 124 may be divided into a plurality of modules according to functions.

The control unit 125 may control the overall operation of each component of the user terminal 120 and perform a computational operation on at least one application or program for executing the methods according to the embodiments of the present invention.

Each of the operations described with reference to FIGS. 4 to 6 will be described below as being performed by the control units 115 and 125 of the sensing terminal 110 and the user terminal 120, but the subject of each step is not limited thereto. At least a part of each step may be performed in different configurations or in different devices depending on the embodiment. Also, the operations performed between one sensing terminal 110 and one user terminal 120 will be described below with reference to FIGS. 4 and 6. However, there is no limit to the number of sensing terminals 110 and the number of user terminals 120 included in the data transmission/reception system, and the data transmission/reception method according to the present invention is applied between the plurality of sensing terminals and the plurality of user terminals. This can be easily performed by those skilled in the art.

Figure 4:
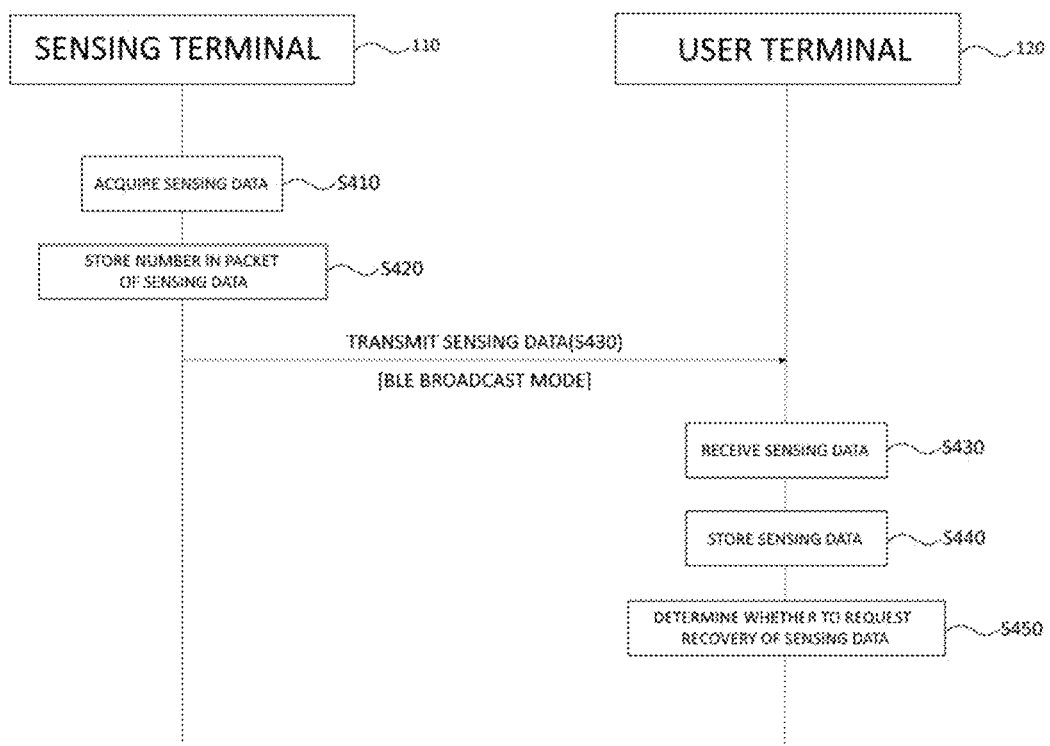
FIGS. 4 and 5 are flowcharts illustrating a data transmission/reception method according to an embodiment.

FIG. 4 is a flowchart illustrating a data transmission/reception method according to an embodiment.

Referring to FIG. 4, the sensing terminal 110 acquires sensing data (operation S410). Preferably, the sensing data may be acquired periodically or when a preset event occurs. The acquisition criterion may be set for each type of sensing data.

The sensing terminal 110 stores a number in a packet of the sensing data (operation S420). The packet is a formatted block of the sensing data transmitted to the user terminal 120 and may indicate the sequence of the sensing data in which number information is input to the header of the packet and that is transmitted to the user terminal 120. Preferably, the sensing terminal 110 may sequentially assign a number on the basis of the time at which the sensing data is acquired and store the number in the packet, and the sensing data to which the number is assigned is stored in the memory 114.

The sensing terminal 110 transmits the sensing data to the user terminal 120 (step S430). At this time, the sensing data is transmitted through the broadcast mode of BLE communication. That is, the sensing terminal 110 transmits and receives data through the broadcast mode of BLE communication unless a request for switching the communication mode is received from the user terminal 120.

The user terminal 120 receives the sensing data from the sensing terminal 110 (operation S430) and stores the sensing data (operation S440). Preferably, the user terminal 120 may store and manage the received sensing data for each sensing terminal and may transmit a response message to the number of the received sensing data to the corresponding sensing terminal 110. That is, since the user terminal 120 stores and manages sensing data for each sensing terminal, the data transmission/reception method according to the present invention can be applied even when sensing data is received from a plurality of sensing terminals. By transmitting a response message to the number of the sensing data, the synchronization of the numbers of the sensing data stored and managed by the sensing terminal 110 and the user terminal 120 may be maintained.

Subsequently, the user terminal 120 determines whether to request the recovery of the sensing data (operation S450). Preferably, the user terminal 120 may compare the number stored in the packet of the sensing data received in operation S430 and the number stored in the packet of the pre-stored sensing data and may determine whether to request the recovery of sensing data having a specific number according to the result of comparing the numbers.

More specifically, the user terminal 120 may check whether the sensing data having the same format as the sensing data received in operation S430 is prestored and may determine not to proceed with the recovery request when the sensing data having the same format is not prestored. When it is determined in operation S450 not to request the sensing data recovery, the user terminal 120 waits to receive new sensing data from the sensing terminal 110.

In an embodiment, when the sensing data having the same format as the received sensing data is prestored, the user terminal 120 may compare the number of the received sensing data to the number of the last sensing data stored before the sensing data received through operation S440 is stored among the prestored sensing data having the same format. When the number of the last stored sensing data and the number of the received sensing data are not continuous, the user terminal 120 may determine a number between the number of the last stored sensing data and the number of the received sensing data as a missing number and may determine to proceed with a request for recovery of sensing data corresponding to the missing number.

In another embodiment, when the sensing data having the same format as the received sensing data is prestored, the user terminal 120 may check the number of the sensing data having the same format and the number of the sensing data received in operation S430, determine whether the checked numbers are continuous, and check a missing number. That is, the user terminal 120 may check whether there is a missing number in the middle by checking the numbers of all of the sensing data having the same format or the numbers of some sensing data corresponding to numbers after a specific number and determine whether there is a missing number between the numbers. If it is determined that there is a missing number, the user terminal 120 may determine to proceed with a request for recovery of sensing data corresponding to the missing number.

Figure 6:
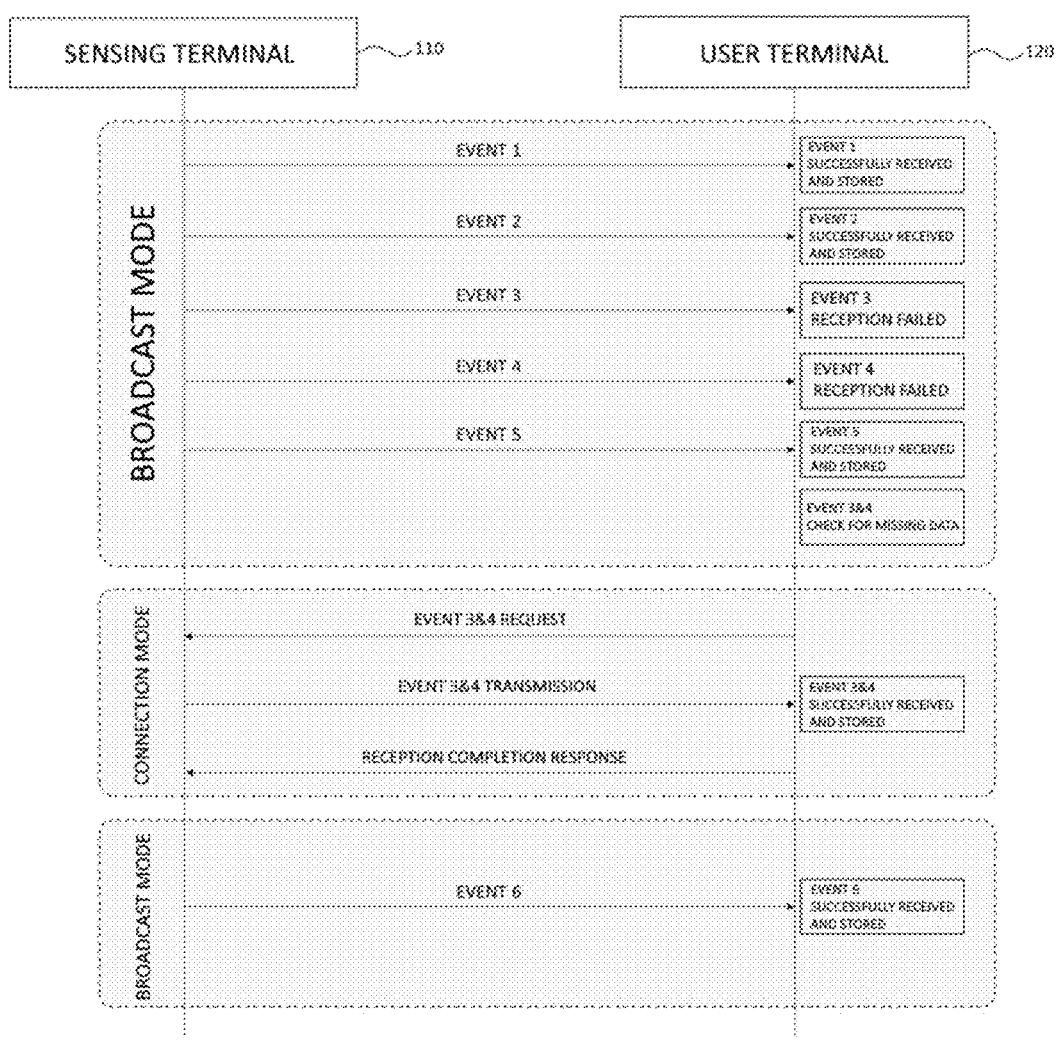
FIG. 6 is an exemplary diagram illustrating a data transmission/reception method according to an embodiment.

For example, referring to FIG. 6, the sensing terminal 110 may transmit sensing data to the user terminal 110 in the broadcast mode of BLE communication whenever it acquires the sensing data. EVENT1 and EVENT2 are transmitted while communication is established between the sensing terminal 110 and the user terminal 120 and are received normally and stored in the user terminal 120, and EVENT3 and EVENT4 indicate cases in which sensing data is not received and stored in the user terminal 120 when communication is cut off between the sensing terminal 110 and the user terminal 120 or when other communication problems occur. In this state, when EVENT5 is transmitted from the sensing terminal 110 and is received normally and stored by the user terminal 120, the user terminal 120 may compare the number "2" of the sensing data corresponding to the last stored data, EVENT2, among the prestored sensing data to the number "5" of EVENT5, which is the received sensing data, check the missing numbers "3" and "4," and request the sensing terminal 110 to recover the sensing data corresponding to EVENT3 and EVENT4.

When it is determined to request the sensing data recovery, a data transmission/reception method is performed according to a flow illustrated in FIG. 5 to be described below.

Figure 5:
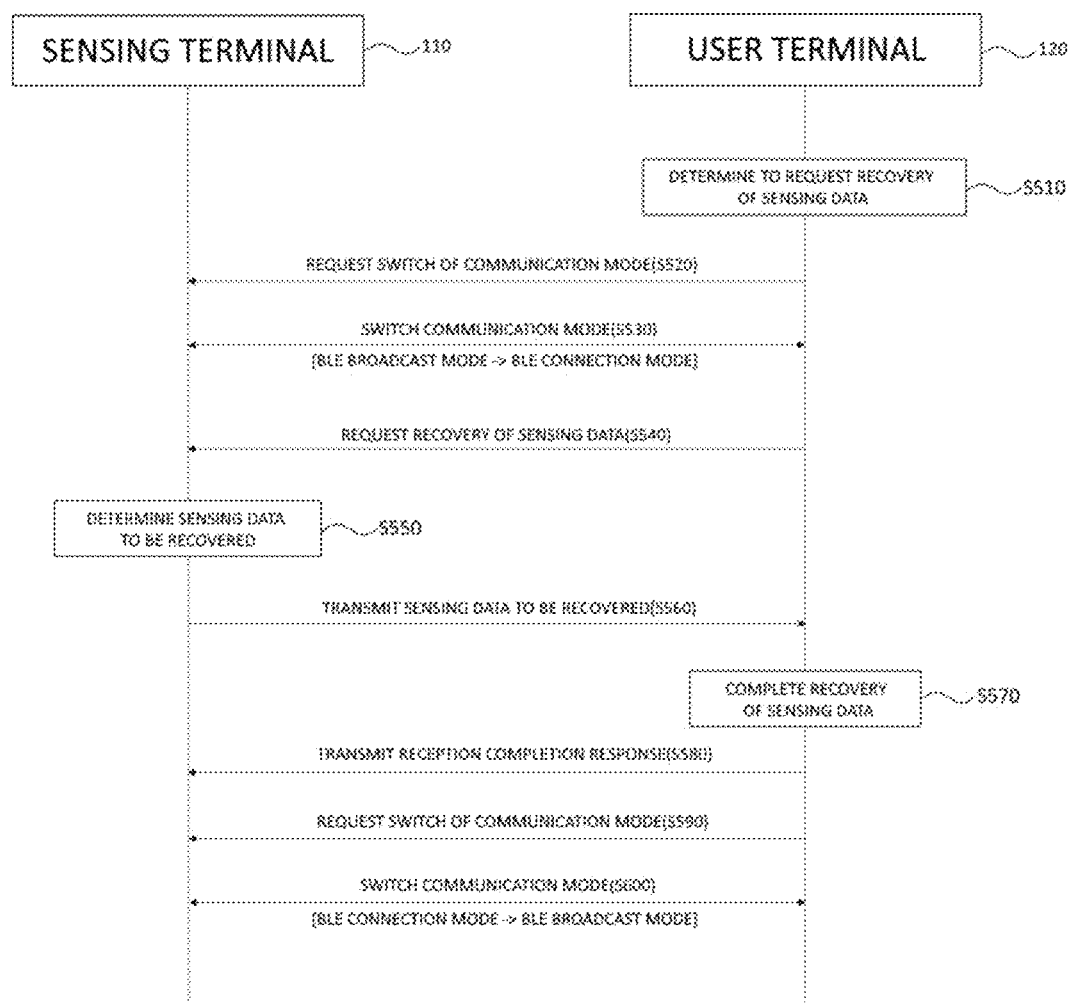

FIG. 5 is a flowchart illustrating a data transmission/reception method according to an embodiment.

Referring to FIG. 5, when a user terminal 120 determines to request recovery of sensing data (operation S510), the user terminal 120 requests the sensing terminal 110 to switch a communication mode (operation S520). BLE communication may include a broadcast mode and a connection mode, and the sensing terminal 110 may find a signal coming from the user terminal 120. When the switch request for the communication mode is received from the user terminal 120, the sensing terminal 110 may perform a switch between the broadcast mode and the connection mode.

The sensing terminal 110 switches the communication mode from the broadcast mode of BLE communication to the connection mode by pairing with the user terminal 120 (operation S530). When the switch to the connection mode of BLE communication is completed, the user terminal 120 requests the sensing terminal 110 to recover the sensing data (operation S540).

That is, the user terminal 120 requests sensing data corresponding to a missing number from the sensing terminal 110.

The sensing terminal 110 determines sensing data to be recovered according to the request of the user terminal 120 (operation S550). Preferably, upon receiving a request for the sensing data corresponding to the missing number from the user terminal 120, the sensing terminal 110 may request current time information from the user terminal 120. The sensing terminal 110 may check the current time information received from the user terminal 120 and acquisition time information for the sensing data corresponding to the missing number and determine the sensing data to be transmitted to the user terminal 120.

The sensing terminal 110 transmits the sensing data determined in operation S550 to the user terminal 120 (operation S560).

The user terminal 120 stores the sensing data to be recovered which is received from the sensing terminal 110 and completes the recovery of the sensing data (operation S570), and transmits a reception completion response for the recovery completion to the sensing terminal 110 (operation S580). Here, when there is no missing sensing data after the recovery is completed, the sensing data stored for a certain period may be transmitted to a separate server (not shown) and managed.

In an embodiment, when any one of operations S520 to S580 is not performed and the recovery of sensing data is not completed in the process of recovering the sensing data between the sensing terminal 110 and the user terminal 120 because an error occurs due to communication cutoff, a dead battery, or any of various other causes, the user terminal 120 may request unrecovered sensing data from the sensing terminal 110 by continuously requesting the sensing terminal 110 to perform a switch to the connection mode of BLE communication. Alternatively, when receiving sensing data that has not been transmitted due to an error of connection to the sensing terminal 110 from the sensing terminal 110 because the connection error is solved or whenever receiving sensing data from the sensing terminal 110, the user terminal 120 may request the sensing terminal 110 to recover the sensing data by checking missing sensing data. Preferably, the user terminal 120 may allow the confirmation and verification of the sensing data to be efficiently performed by separately managing sensing data that is stored for a certain period without missing sensing data after the recovery is completed and by excluding corresponding sensing data when checking the presence or absence of the missing sensing data. The user terminal 120 requests a switch of the communication mode from the sensing terminal 110 (operation S590), and the sensing terminal 110 and the user terminal 120 disconnect the connection mode and switch to the broadcast mode (operation S600). When the communication mode is switched to the broadcast mode, the sensing terminal 110 and the user terminal 120 transmit and receive sensing data again as in operations S410 to S450.

For example, referring to FIG. 6, in order to recover missing sensing data corresponding to EVENT3 and EVENT4, the user terminal 120 may establish a connection mode with the sensing terminal 110 and then request EVENT3 and EVENT4 from the sensing terminal 110. When the user terminal 120 receives and stores EVENT3 and EVENT4 normally from the sensing terminal 110, the user terminals 120 may send a reception completion response to the sensing terminal 110 and request a switch to the broadcast mode. That is, only the recovery of the missing sensing data is performed in the connection mode of BLE communication. After the recovery of the missing sensing data is completed and the communication mode is switched to the broadcast mode, the user terminal 120 may receive and store EVENT6, which is sensing data transmitted from the sensing terminal 110. Subsequently, when there is missing sensing data, the recovery of the missing sensing data may be performed through confirmation and a communication mode switch as in the method described with reference to FIGS. 4 and 5.

As described above, according to the present invention, information is transmitted in real time without pairing, and when there is lost data, the communication mode is switched to recover the lost data and compensate for the loss, so that it is possible to increase the stability of data transmission and reception even if the user does not directly check it.

The steps of a method or algorithm described in connection with an embodiment of the present invention may be embodied directly in hardware, in a software module executed by hardware, or a combination of the two. A software mode may reside in a random access memory (RAM), read-only memory (ROM), erasable programmable ROM (EPROM), electrically erasable programmable ROM (EEPROM), flash memory, hard disk, removable disk, CD-ROM, or any form of computer readable storage medium that is known in the art.

The elements of the present invention may be implemented as a program (or application) that can be executed in combination with a computer, which is hardware, and may be stored in a medium. The elements of the present invention may be executable with software programming or software elements. Similarly, the embodiments may be implemented with a programming or scripting language, such as C, C++, Java, and an assembler, including various algorithms implemented with a combination of data structures, processes, routines or other programming elements. Functional aspects may be implemented with an algorithm executed by one or more processors.

Although exemplary embodiments of the data transmission/reception method and system according to the present invention have been described above, the present invention is not limited thereto, and various modifications can be made within the scope of the claims, the detailed description of the invention, and the accompanying drawings and also belong to the present invention.

What is claimed is:

1. A data transmission/reception method performed in a data transmission/reception system including a sensing terminal and a user terminal connected through Bluetooth low energy (BLE) communication, the data transmission/reception method comprising operations of:
    allowing the sensing terminal to acquire sensing data;
    allowing the sensing terminal to sequentially assign a number on the basis of the time at which the sensing data is acquired and store the number in a packet of the sensing data;
    allowing the sensing terminal to transmit the sensing data in which the number is stored to the user terminal in a broadcast mode of the BLE communication;
    allowing the user terminal to receive the sensing data;
    allowing the user terminal to compare the number of the sensing data to the number of prestored sending data; and
    allowing the user terminal to store the received sensing data and determine whether to request recovery of sensing data having a specific number according to a comparison result of the numbers.

2. The data transmission/reception method of claim 1, wherein the operation of allowing the user terminal to store the received sensing data and determine whether to request recovery of sensing data having a specific number according to a comparison result of the numbers comprises operations of:
    checking whether sensing data having the same format as the received sensing data is prestored; and
    determining not to proceed with the recovery request when sensing data having the same format as the received sensing data is not prestored.

3. The data transmission/reception method of claim 1, wherein the operation of allowing the user terminal to store the received sensing data and determine whether to request recovery of sensing data having a specific number according to a comparison result of the numbers comprises operations of:
    checking whether the sensing data having the same format as the received sensing data is prestored;
    comparing the number of the received sensing data and the number of the last stored sensing data among the prestored sensing data having the same format when the sensing data having the same format is prestored;
    determining a number between the number of the received sensing data and the number of the last stored sensing data as a missing number when the number of the last stored sensing data and the number of the received sensing data are not continuous; and
    determining to proceed with a request for recovery of sensing data corresponding to the missing number.

4. The data transmission/reception method of claim 1, wherein the operation of allowing the user terminal to store the received sensing data and determine whether to request recovery of sensing data having a specific number according to a comparison result of the numbers comprises operations of:
    checking whether the sensing data having the same format as the received sensing data is prestored;
    checking the number of the received sensing data and the numbers of all the prestored sensing data having the same format when the sensing data having the same format is prestored;
    determining whether the checked numbers are continuous to check a missing number; and determining to proceed with a request for recovery of sensing data corresponding to the missing number.

5. The data transmission/reception method of claim 4, further comprising operations of:
allowing the user terminal to request a connection mode of the BLE communication from the sensing terminal to proceed with the recovery request; and
allowing the user terminal to pair with the sensing terminal to switch to a connection mode.

6. The data transmission/reception method of claim 5, further comprising operations of:
allowing the user terminal to request the sensing data corresponding to the missing number from the sensing terminal;
allowing the user terminal to transmit a reception completion response to the sensing terminal when the sensing data corresponding to the missing number is received from the sensing terminal; and
allowing the user terminal to store the sensing data corresponding to the missing number.

7. The data transmission/reception method of claim 6, further comprising operations of:
allowing the sensing terminal to request current time information from the user terminal when a request for the sensing data corresponding to the missing number is received from the user terminal;
allowing the sensing terminal to check acquisition time information for the sensing data corresponding to the missing number and the current time information received from the user terminal and determine sensing data to be transmitted to the user terminal; and
allowing the sensing terminal to transmit the determined sensing data to the user terminal.

8. The data transmission/reception method of claim 7, further comprising operations of:
allowing the user terminal to request the broadcast mode of the BLE communication from the sensing terminal when the recovery of the sensing data corresponding to the missing number is completed; and
allowing the user terminal and the sensing terminal to switch to the broadcast mode.

9. A data transmission/reception system comprising:
a sensing terminal configured to acquire sensing data; and
a user terminal connected to the sensing terminal through Bluetooth low energy (BLE) communication and configured to receive the sensing data,
wherein a number is sequentially assigned to the sensing data on the basis of the time at which the sensing data is acquired, and is stored in a packet of the sensing data, and the sensing data is transmitted in a broadcast mode of the BLE communication; and
wherein the user terminal is configured to receive the sensing data and to compare the number assigned to the sensing data to the number of the prestored sending data and wherein the user terminal is further configured to store the received sensing data and determine whether to request recovery of sensing data having a specific number according to a comparison result of the numbers.

* * * * *